(12) United States Patent
Marchionni et al.

(10) Patent No.: US 7,329,784 B2
(45) Date of Patent: Feb. 12, 2008

(54) PROCESS FOR PREPARING PEROXIDIC PERFLUOROPOLYETHERS

(75) Inventors: Giuseppe Marchionni, Milan (IT); Pier Antonio Guarda, Milan (IT); Elvira Pagano, Milan (IT)

(73) Assignee: Solvay Solexis, Milan (IT)

( * ) Notice: Subject to any disclaimer, the term of this patent is extended or adjusted under 35 U.S.C. 154(b) by 0 days.

(21) Appl. No.: 11/370,042

(22) Filed: Mar. 8, 2006

(65) Prior Publication Data

US 2006/0205982 A1 Sep. 14, 2006

(30) Foreign Application Priority Data

Mar. 10, 2005 (IT) .................... MI2005A0384

(51) Int. Cl.
*C07C 409/00* (2006.01)

(52) U.S. Cl. .................................... 568/560

(58) Field of Classification Search ................. 568/560
See application file for complete search history.

(56) References Cited

U.S. PATENT DOCUMENTS

| 3,715,378 A | 2/1973 | Sianesi et al. |
| 3,810,874 A | 5/1974 | Mitsch et al. |
| 3,847,978 A | 11/1974 | Sianesi et al. |
| 4,451,646 A | 5/1984 | Sianesi et al. |
| 5,777,291 A * | 7/1998 | Marchionni et al. ..... 204/157.6 |
| 5,783,789 A * | 7/1998 | Guarda et al. ........... 204/157.6 |

FOREIGN PATENT DOCUMENTS

| EP | 0 790 268 A2 | 8/1997 |
| EP | 0 790 270 A2 | 8/1997 |
| EP | 1 524 287 A1 | 4/2005 |
| EP | 1 568 730 A1 | 8/2005 |

* cited by examiner

*Primary Examiner*—Yvonne (Bonnie) Eyler
*Assistant Examiner*—Chukwuma Nwaonicha
(74) *Attorney, Agent, or Firm*—Arent Fox LLP

(57) ABSTRACT

A process for preparing peroxidic perfluoropolyethers having a peroxidic content (PO) higher than 1.2 of formula $$A\text{-}CF_2O(CF_2CF_2O)^m(CF_2O)_n\text{—}(CF_2CF_2OO)^{m1}(CF_2OO)_{n1}CF_2\text{—}B \quad (I)$$

wherein
A, B, equal to or different from each other are Cl—, F—, ClCF$^2$—, COF—, —OCOF, —CF$_3$,
m, m1, n, n1 are integers such that the (m+m1)/(n+n1) ratio is between 0.9 and 5 and the m/n ratio is between 0.8 and 3,
the number average molecular weight is in the range 35,000-45,000, by tetrafluoroethylene (TFE) photooxidation in the presence of UV light, at a temperature from −80° C. to −40° C., in the presence of a mixture of solvents formed of HFC-227 (heptafluoropropane) and a solvent selected from HFC-125 (pentafluoroethane) and FC-218 (perfluoropropane).

13 Claims, No Drawings

PROCESS FOR PREPARING PEROXIDIC PERFLUOROPOLYETHERS

The present invention relates to a process for preparing peroxidic perfluoropolyethers having a peroxidic content (PO), expressed in g of active oxygen per 100 g of peroxidic perfluoropolyether, higher than 1.2 by tetrafluoroethylene (TFE) photooxidation in the presence of solvents environmental friendly.

More specifically, the invention relates to a process for preparing peroxidic perfluoropolyethers having a peroxidic content (PO) higher than 1.2 using a drop-in solvent of CFC 12 by tetrafluoroethylene (TFE) photooxidation.

Still more specifically, the invention relates to a process for preparing, by tetrafluoroethylene (TFE) photooxidation, peroxidic perfluoropolyethers having a peroxidic content (PO) higher than 1.2 using a drop-in solvent of CFC 12 capable to give substantially the same peroxidic precursors of the various commercial perfluoropolyethers.

It is known that peroxidic perfluoropolyethers (PFPEs) are used as precursors of various perfluoropolyether-based compounds commercially known as Fomblin® Z derivatives, H-Galden®, Fluorolink®.

In particular the Fomblin® Z derivatives, reported in Table 1, are obtained starting from peroxidic perfluoropolyethers having formula:

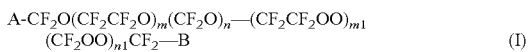

$$A\text{-}CF_2O(CF_2CF_2O)_m(CF_2O)_n\text{—}(CF_2CF_2OO)_{m1}(CF_2OO)_{n1}CF_2\text{-}B \quad (I)$$

wherein A and B, equal to or different from each other, are Cl—, F—, ClCF$_2$—, COF—, —OCOF, —CF$_3$; m, m1, n, n1 are integers such as to obtain the number average molecular weight indicated below, and having:
PO between 1.2 and 1.8;
m/n between 0.8 and 1.2;
number average molecular weight in the range 35,000-45,000.

In particular the H-Galden® and Fluorolink®, reported in Tables 3 and 2 respectively, are obtained starting from peroxidic perfluoropolyethers having the same formula (I) but having:
PO between 2.5 and 3.5;
m/n between 1.7 and 3;
number average molecular weight in the range 35,000-45,000.

All the peroxidic perfluoropolyethers of formula (I) are prepared according to a process comprising the TFE photooxidation at temperatures between −40° C. and −80° C. wherein as solvent the dichloro-difluoromethane (CFC-12) is used. To prepare the above precursors the teaching of U.S. Pat. Nos. 3,715,378, 4,451,646 is followed.

From said peroxidic precursors of formula (I), by chemical reduction of the peroxidic bonds, the corresponding bifunctional derivatives are obtained having the following formula:

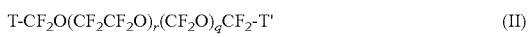

$$T\text{-}CF_2O(CF_2CF_2O)_r(CF_2O)_qCF_2\text{-}T' \quad (II)$$

wherein
r, q are integers such that the r/q ratio is between 0.8 and 3, and the number average molecular weight is between 500 and 2,000;
the chain end groups T and T', equal to or different from each other, are of the —C(O)X type, wherein X=F or OR, wherein R is an alkyl.

To obtaining the compounds of formula (II) see the teaching of U.S. Pat. Nos. 4,451,646, 3,847,978.

The chemical reduction of the peroxidic compound of formula (I) in the non peroxidic compound of formula (II) does not imply a substantial variation of the molar ratio $(CF_2CF_2O)/(CF_2O)$, i.e. the m/n ratio of the peroxidic precursor (I) substantially results equal to the r/q ratio of the compound (II). Then the functional groups T, T' of the derivatives of formula (II) are transformed into the functional groups of the desired commercial compounds by known reactions. The methods indicated in U.S. Pat. No. 3,810,874 can for example be used. The obtained products are then subjected to fractional distillation to obtain the various commercial grades of the products reported in the Tables 1, 2, 3. These reactions involve the T, T' end groups but they do not change the ratios between $(CF_2CF_2O)/(CF_2O)$ units, i.e. the r/q ratios. Therefore the commercial products H-Galden®, Fluorolink®, Fomblin Z® derivatives have the same molar ratios $(CF_2CF_2O)/(CF_2O)$ of the corresponding precursors of formula (II) and (I). It is therefore essential to have available the two above mentioned specific precursors to be able to obtain the various non peroxidic commercial products.

The processes for preparing the peroxidic compounds of formula (I) using CFC 12 required several and difficult efforts of modifications of the reaction conditions to prepare the two above precursor types from which the commercial products having the technical specifications reported in the Tables from 1 to 3, are obtained. However, it is well known that CFCs, due to the Montreal Protocol and its modifications, have been banned or are going to be shortly banned.

It was desirable to have available a process for preparing the precursors of formula (I) having the above PO, molecular weight and m/n values, using a solvent without environmental impact problems on the ozone (ODP) and preferably having a low greenhouse effect (GWP), and being a drop-in solvent of CFC-12 capable to give the same peroxidic precursors, in particular the same peroxidic precursors of the two above classes.

The Applicant had previously found that a possible solvent not containing chlorine and substitutive of CFC-12 was perfluoropropane (FC 218). See for example U.S. Pat. No. 5,777,291. However, by operating under the same process conditions (reactor volume, gaseous reactant flow-rate, radiant power, reaction temperature), peroxidic perfluoropolyethers of formula (I) are obtained having m/n ratios different from those obtained by operating with CFC-12. In particular peroxidic perfluoropolyethers, having a m/n ratio higher than that obtained with CFC-12, are obtained, with the consequence that the corresponding derivatives of formula (II) have a higher r/q ratio. These variations are not permitted in the above commercial products since they are sold with well defined technical specifications. Indeed the final users require products with specifications since they have finalized their processes and/or products basing themselves on the well defined technical specifications of the compounds reported in the Tables from 1 to 3. From the commercial point of view, when the products are not within the specification, they are not accepted by the final user to avoid that the use of these products brings to variations in their performances. Likewise for the processes using the products within specifications as such.

For example, if the perfluoropolyethers of formula (II) have r/q ratios different from those of the commercial products of Tables 1, 2, 3, they show chemico-physical properties as, for example, viscosity, density and Tg different from those of the commercial products of the Tables 1, 2, 3 and therefore are not suitable to satisfy the requirements of the users.

It has been also proposed by the Applicant the use of HFC 125 (pentafluoroethane) in the TFE photooxidation as described in U.S. Pat. No. 5,783,789. In this patent it is said that the mixtures of HFC 125 with $C_3$-$C_7$ perfluorocarbons act likewise as HFC 125. Tests carried out by the Applicant have however shown that HFC 125 does not allow to synthetize peroxidic perfluoropolyethers having a high molecular weight (number average molecular weight), for example higher than 30,000 dalton. If one tries to prepare products having molecular weights between 35,000 and 45,000 there is an uncontrolled separation of the peroxidic product from the solvent. These causes cloggings in the plant, reduces the thermal exchange and causes product stagnations which are at the risk of explosions when the PO exceeds the 4.5 value. As a matter of fact, under these synthesis conditions, an uncontrolled PO increase takes place. Therefore the process using HFC-125 is limited since it is not possible to prepare the peroxidic PFPEs of formula (I) having number average molecular weights in the range 35,000-45,000, necessary to obtain the commercial products of the Tables 1, 2, 3.

Another solvent proposed by the Applicant in the TFE photooxidation processes is HFC-227ea (2-hydroheptafluoropropane). See for example the patent application EP 04 022 780.3. However, by operating under the same conditions as with CFC-12, peroxidic perfluoropolyethers of formula (I) are obtained having m/n ratios different from those obtained by operating with CFC-12. In particular peroxidic perfluoropolyethers having a m/n ratio lower than that obtained with CFC-12 are obtained, with the consequence that the corresponding derivatives of formula (II) have a lower r/q ratio. As said above, this means the obtainment of products having chemico-physical properties as viscosity, density and Tg different from those of the commercial products of the Tables 1, 2, 3.

The need was therefore felt to have available a process for preparing the precursors of formula (I) having the above PO, molecular weight and m/n values, by using a solvent without environmental impact problems and being drop-in of CFC-12 capable to give substantially the same peroxidic precursors of the above classes.

It has been found that it is possible to overcome the above drawbacks by substituting the CFC-12 solvent with mixtures of particular solvents environmental friendly as regards ODP and preferably having a low GWP.

An object of the present invention is therefore a process for preparing peroxidic perfluoropolyethers having a peroxidic content (PO) higher than 1.2 of formula:

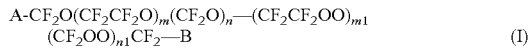

wherein
A, B, equal to or different from each other are Cl—, F—, ClCF$_2$—, —COF, —OCOF, —CF$_3$,
m, m1, n, n1 are integers such that the (m+m1)/(n+n1) ratio is comprised between 0.9 and 5 when (n+n1) is different from 0 and the m/n ratio is between 0.8 and 3, when n is different from 0,
the number average molecular weight is in the range 35,000-45,000, wherein:
when m/n is between 0.8 and 1.2 (n being different from 0), the PO is between higher than 1.2 and 1.8;

when m/n is between 1.7 and 3.0 (n being different from 0), the PO is between 2.5 and 3.5; by tetrafluoroethylene (TFE) photooxidation in the presence of UV light, at low temperature, preferably from −80° C. to −40° C., more preferably from −70° C. to −55° C., in the presence of a mixture of solvents formed of HFC-227 (heptafluoropropane) and a solvent selected from HFC-125 (pentafluoroethane) and FC-218 (perfluoropropane), in a volumetric ratio (HFC 125 or FC 218)/HFC 227 between 90/10 and 10/90, preferably between 85/15 and 30/70, in the presence of a chain transfer agent.

Preferably the chain transfer agent of the molecular weight is selected between fluorine, diluted with an inert gas, or chlorotrifluoroethylene.

As solvent, ternary mixtures of HFC-227 in admixture with HFC-125 and FC-218 can also be used.

Generally the TFE concentration is between 0.03 and 0.2 moles/liter of reaction mixture, preferably between 0.05 and 0.15 moles/liter. Therefore the TFE flow-rate is such to obtain said concentrations.

The used oxygen amount is generally such to saturate the reaction mixture; generally one operates with an oxygen molar excess with respect to TFE and the partial oxygen pressure is generally between 0.1 and 2 atm, preferably between 0.2 and 1 atm.

Preferably the volumetric ratio HFC 125/227 is between 90/10 and 40/60, more preferably between 85/15 and 70/30.

Preferably the volumetric ratio FC 218/HFC 227 is between 70/30 and 30/70.

HFC 125/227 mixtures are preferred due to their low environmental impact (low GWP).

The UV light having a wave length between 200 and 350 nm is used with a radiant power with respect to the reactor volume between 5 and 40 W/liter, preferably between 10 and 30 W/liter of reaction mixture.

The peroxidic perfluoropolyethers (I), precursors of the bifunctional derivatives of Table 1 (Fomblin Z® derivatives), have a PO between 1.2 and 1.8 and number average molecular weight in the range 35,000-45,000 and a m/n ratio between 0.8 and 1.2. To prepare said peroxidic perfluoropolyethers with the process of the present invention one preferably operates under the following conditions:
temperature between −70° C. and −55° C.;
feeding TFE flow-rate per volume unit between 30 and 50 kg/(h·m$^3$);
feeding O$_2$ flow-rate such that the molar ratio O$_2$/TFE is between 1.1 and 3;
a volumetric ratio HFC 125/227 between 85/15 and 70/30, or a volumetric ratio FC-218/HFC-227 between 70/30 and 30/70;

in the presence of a chain transfer agent of the molecular weight selected from fluorine diluted with an inert gas or chlorotrifluoroethylene, in an amount such that the molar ratio chain transfer agent/tetrafluoroethylene is between 1·10$^{-2}$ and 1·10$^{-3}$ and, in the fluorine case, it is diluted with the inert gas in volume ratios from 1/50 to 1/1,000.

The peroxidic perfluoropolyethers (I) from which the bifunctional derivatives of the Tables 2 and 3 are obtained (Fluorolink® and H-Galden®) have a PO between 2.5 and 3.5, a number average molecular weight in the range 35,000-45,000 and a m/n ratio between 1.7 and 3.0. To prepare said peroxidic perfluoropolyethers with the process of the present invention one preferably operates under the following conditions:

temperature between −70° C. and −55° C.;
feeding TFE flow-rate per volume unit between 50 and 100 kg/(h·m$^3$);
feeding O$_2$ flow-rate such that the molar ratio O$_2$/TFE is between 1.1 and 3;
a volumetric ratio HFC 125/227 between 85/15 and 70/30, or a volumetric ratio FC-218/HFC-227 between 70/30 and 30/70;

in the presence of a chain transfer agent of the molecular weight selected from fluorine diluted with an inert gas or chlorotrifluoroethylene, in an amount such that the molar ratio chain transfer agent/tetrafluoroethylene is between $1 \cdot 10^{-2}$ and $1 \cdot 10^{-3}$ and, in the fluorine case, it is diluted with the inert gas in volume ratios from 1/50 to 1/1,000.

The derivatives commercially known as H-Galden® are used as CFC and FC substitutes, as solvents and as fluids for heat transfer for primary circuits and secondary circuits, for direct and indirect refrigeration, drying and cleaning of electronic circuits, foaming agents and extinguishing agents.

The derivatives commercially known as Fomblin Z® derivatives are used as lubricants for magnetic media, as precursors of polycondensation polymers, for example polyurethanes, polyamides, polyesters.

The derivatives commercially known as Fluorolink® are used in the treatment of surfaces as paper, glass, ceramic, textile fibers, metals to confer water- and oil-repellence. They are also used as modifiers of non fluorinated polymers.

As said, the process of the present invention has made available a mixture of drop-in solvents of CFC 12 in the preparation of commercial perfluoropolyethers. In particular the process of the present invention allows to replace the CFC-12 solvent without modifying the operating conditions of the photooxidation process and thus without the use of supplementary industrial units, and therefore without an increase of costs, obtaining peroxidic perfluoropolyethers having the same structure as those of formula (I), from which the bifunctional derivatives required by the market and marketed, reported in the Tables 1-3, are obtained.

Some illustrative but non limitative Examples of the present invention follow.

EXAMPLES

Characterization

Iodometric Analysis

The analysis of the peroxidic content (PO) is carried out according to the following procedure: one dissolves a weighed amount of peroxidic perfluoropolyether (some grams) in about 20 ml of Galden® ZT 130, 1 ml of acetic acid and 30 ml of a sodium iodide solution at 5% in isopropyl alcohol are added. The mixture is put under strong stirring for 15 minutes and the iodine developed from the reaction with the peroxide is titrated with an aqueous solution of sodium thiosulphate having a known titre, by using a Mettler DL40 potentiometric titrator equipped with a platinum electrode and a reference electrode.

The peroxide content (PO) is expressed in grams of active oxygen (MW=16) per 100 grams of peroxidic perfluoropolyether.

$^{19}$F-NMR Analysis

The molecular weight is determined by $^{19}$F-NMR spectroscopy by using an instrument operating at 400 MHz frequency. The spectrum shows the signals due to the fluorine atoms linked to the chain end groups as CF$_3$O—, CF$_3$CF$_2$O—, ClCF$_2$O—, ClCF$_2$CF$_2$O, FC(O)CF$_2$O—, FC(O)O— and to the repeating units present in the polymeric chain (CF$_2$CF$_2$O), (CF$_2$O), (CF$_2$CF$_2$OO), (CF$_2$OO). From the ratio between the signals of the fluorine atoms linked to the end groups and those of the repeating units present in the polymeric chains the number average molecular weight is calculated.

Example 1

Preparation of a Peroxidic Perfluoropolyether (PFPE) with PO=3.5% by using a HFC-125/227ea Mixture The continuous photosynthesis plant is equipped with a high pressure mercury lamp inserted in the coaxial sheath of the 30 liter cylindrical reactor and cooled by means of circulating demineralized water, with reacting gas feeding lines and a drawing line of the reaction mixture, connected to an evaporation column of the reaction solvent from the product.

The reactor is cooled to −65° C. and 50 kg of HFC-125/227 mixture are introduced in a 72/28 w/w ratio corresponding to a ratio by volume of 75/25. Then 450 Nl/h of oxygen are initially fed and immediately after the mercury lamp is turned on having a radiant power equal to 330 W in the UV wave length range between 200 and 350 nm.

2.6 kg/h of tetrafluoroethylene are then fed together with the oxygen and 2.2 Nl/h of CTFE (CF$_2$CFCl) through another bubbling inlet. The extraction flow-rate of the reaction mixture is such as to have a constant concentration of peroxidic raw product in the solvent, in the order of 7%.

The product obtained in stationary conditions shows the following characteristics: a peroxidic content (PO), determined by iodometric analysis, equal to 3.5 g of active oxygen/100 g of peroxidic perfluoropolyether. The $^{19}$F-NMR analysis confirms the following structure:

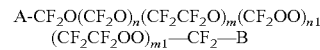

wherein the end groups —CF$_2$—A and —CF$_2$—B are equal to or different from each other. The end groups and the respective molar percentages with respect to the total of the end groups are the following: —CF$_3$ 22.34%; —CF$_2$Cl 43.56%; —CF$_2$COF 34.1%. The number average molecular weight is 35,500; m=182.0, m1=70.9, n=71.3, n1=3.8, from which it results a m/n ratio=2.51.

Example 2 (Comparative)

The Example 1 was repeated but by using CFC-12 as solvent.

The obtained peroxidic raw product has a peroxidic content (PO), determined by iodometric analysis, of 3.45 g of active oxygen/100 g of polymer. The $^{19}$F-NMR analysis confirms the following structure:

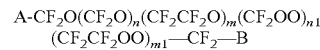

wherein the end groups —CF$_2$—A and —CF$_2$—B are equal to or different from each other. The end groups and the respective molar percentages with respect to the total of the end groups are the following: —CF$_3$ 15.9%; —CF$_2$Cl 48.6%; —CF$_2$COF 35.5%. The number average molecular weight is 35,000; m=179.5, m1=69.9, n=70.3, n1=3.8, from which it results a m/n ratio=2.55.

By comparing the data of the Example 1 with the data of the Example 2 (comparative), it results that the peroxidic PFPEs obtained by using the HFC 125/227ea mixture of the present invention are substantially equal to those obtained by using CFC-12 since they substantially show the same number average molecular weight (MW), the same PO and the same m/n ratio among the ether structures.

Example 3 (Comparative)

The Example 1 was repeated but by using only $CF_3CFHCF_3$ (HFC-227ea) as solvent instead of the HFC-227 mixture with HFC-125 (or with FC-218) of the present invention.

After about two hours the test was interrupted since the peroxidic content of the product had exceeded the safety limit (4.5%).

Therefore, by operating under the same conditions of the Example 1 but by using only HFC-227ea, it was not possible to prepare the peroxidic raw product obtained in the Example 1.

Example 4

Preparation of a Peroxidic Perfluoropolyether (PFPE) with PO=2.51% by using a HFC-125/227ea Mixture The Example 1 was repeated but by using a feeding TFE flow-rate equal to 1.9 kg/h and a CTFE flow-rate equal to 1.6 Nl/h. A peroxidic raw product having a PO equal to 2.51 was obtained having formula:

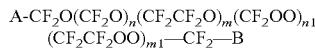

wherein the end groups —$CF_2$—A and —$CF_2$—B are equal to or different from each other. The end groups and the respective molar percentage with respect to the total of the end groups are the following: —$CF_3$ 13.2%; —$CF_2Cl$ 48.9%; —$CF_2COF$ 37.9%. The number average molecular weight is 35,850; m=189.2, m1=49.2, n=106.2, n1=4.8, from which it results a m/n ratio=1.78.

A further test carried out under the same conditions but by using CFC-12 as solvent confirms that the peroxidic perfluoro-polyether obtained by using CFC-12 is substantially equal to that obtained by using the HFC 125/227ea mixture in the structure and in the ratios between the m, n indexes.

Example 5 (Comparative)

By operating under the same conditions of the Example 4, but by using only HFC-227ea instead of the HFC-125/227ea mixture of the present invention, a peroxidic perfluoropolyether is obtained having a peroxidic content (PO), determined by iodometric analysis, of 3.51.

The $^{19}$F-NMR analysis confirms the following formula:

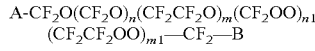

wherein the end groups —$CF_2$—A and —$CF_2$—B are equal to or different from each other. The end groups and the respective molar percentages with respect to the total of the end groups are the following: —$CF_3$ 11.3%; —$CF_2Cl$ 42.23%; —$CF_2COF$ 46.45%. The number average molecular weight is 35,830; m=165.8, m1=68.94, n=104.2, n1=7.47, from which it results a m/n ratio=1.59.

By comparing the data of the Example 4 with those of the Example 5 (comparative), it is evident that the products obtained by using only HFC-227ea, even showing a PO and a molecular weight suitable to the preparation of the commercial compounds of the Tables 2-3, show however a lower m/n ratio (out of the range of the peroxidic PFPEs (I)) and are therefore not suitable for preparing the commercial derivatives H-Galden® and Fluorolink® reported in the Tables 3-2.

Example 6 (Comparative)

The Example 1 was repeated but by using only HFC 125 instead of the HFC 125/227ea mixture of the present invention.

After about 3 hours the test was interrupted since the product segregation from the reaction solvent occurred. The reaction environment being unhomogeneous, an uncontrolled growth of the PO and of the molecular weight was obtained: the peroxidic content, determined by iodometric analysis, is 5.51 g of active oxygen/100 g of polymer.

Example 7 (Comparative)

The Example 1 was repeated but by using only HFC 125 instead of the HFC 125/227ea mixture of the invention and increasing the transfer agent flow-rate to 4.0 l/h.

The obtained product shows a peroxidic content (PO), determined by iodometric analysis, of 3.45 g of active oxygen/100 g of polymer and the $^{19}$F-NMR analysis confirms the following structure:

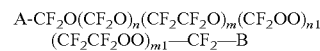

wherein the end groups —$CF_2$—A and —$CF_2$—B are equal to or different from each other. The end groups and the respective molar percentages with respect to the total of the end groups are the following: —$CF_3$ 22.34%; —$CF_2Cl$ 43.56%; —$CF_2COF$ 34.1%. The number average molecular weight is 25,500; m=130.5, m1=50.9, n=51.8, n1=2.7 and m/n=2.51.

From the examination of the data obtained in the Examples 1-7 it is evident that, even changing the operating conditions, it is not possible to obtain peroxidic PFPEs having a molecular weight between 35,000 and 45,000 and soluble in the reaction solvent when HFC 125 is used as solvent.

It has been furthermore verified that, when HFC 125 is used, an homogeneous solution is obtained only with peroxidic perfluoropolyethers having number average molecular weights lower than 27,000, which however are not suitable for preparing the commercial products of the Tables 1, 2, 3.

Example 8

Preparation of a Peroxidic Perfluoropolyether (PFPE) with PO=3.31% by using a HFC-227ea/FC-218 Mixture The Example 4 was repeated by using the HFC-227ea/FC-218 mixture in a 53/47 w/w ratio corresponding to a ratio by volume of 50/50.

A peroxidic raw product is obtained having a PO equal to 3.31 of formula:

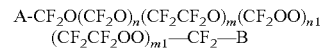

wherein the end groups —$CF_2$—A and —$CF_2$—B are equal to or different from each other. The end groups and the respective molar percentages with respect to the total of the end groups are the following: —$CF_3$ 16.8%; —$CF_2Cl$ 34.6%; —$CF_2COF$ 48.5%. The number average molecular weight is 37,000; m=186.11, m1=57.44, n=108.05, n1=8.5, from which it results a m/n ratio=1.72.

Example 9

Obtainment of the Commercial Products H-Galden® and Fluorolink® from a Peroxidic Perfluoropolyether (PFPE) (I)

The peroxidic perfluoropolyether obtained in the Example 1 was reduced by catalytic reduction with Pd (1.5% by weight) supported on CaF$_2$.

200 g of the perfluoropolyether of the Example 1 and 5 g of catalyst are introduced in a 200 ml metal autoclave, feeding then 10 Nl/h of H$_2$. One heats up to a temperature of 130° C. and after 3 hours 160 g of a product are discharged, having formula (determined by NMR):

$$T\text{-}CF_2O(CF_2CF_2O)_r(CF_2O)_qCF_2\text{-}T' \quad (II)$$

wherein r=4.4, q=1.7, such that the r/q ratio between the ether units (CF$_2$CF$_2$O), (CF$_2$O) is equal to 2.5, which results to be a value equal to the m/n ratio of the peroxidic precursor prepared in the Example 1.

The chain end groups —CF$_2$-T, —CF$_2$-T' are equal to or different from each other.

The end groups and the respective molar percentages with respect to the total of the end groups are the following: —CF$_3$ 0.4%; —CF$_2$Cl 0.8%; —CF$_2$COF 98.8%. The number average molecular weight is 620.

The product of formula (II) is then subjected to distillation, obtaining 2 fractions: as head a fraction having molecular weights between 250 and 900, which, subjected to decarboxylation in the presence of KOH, gives the commercial products H-Galden® from which the commercial fractions of H-Galden® reported in Table 3 are obtained by further distillation.

As end, as residue of the first distillation, a fraction having molecular weights between 900 and 3,500 is obtained, which is then subjected to known reactions to obtain functional end groups as for example those of the commercial compounds Fluorolink® reported in Table 2.

For example, to obtain Fluorolink® C, it is sufficient to hydrolyze the residue of the first distillation and separate the organic phase from the aqueous phase.

Example 10

Preparation of a Peroxidic Perfluoropolyether (PFPE) with PO=1.5% by using a HFC-125/227ea Mixture By using the same plant of the Example 1 and by operating with the same modalities and conditions of the Example 1, 250 Nl/h of oxygen, 1 kg/h of tetrafluoroethylene, together with the oxygen and 0.4 Nl/h of CTFE (CF$_2$CFCl) are fed through another bubbling inlet.

The obtained product shows the following characteristics:

a peroxidic content (PO), determined by iodometric analysis, of 1.5 g of active oxygen/100 g of polymer. The $^{19}$F-NMR analysis confirms the following structure:

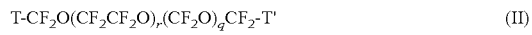

wherein the end groups —CF$_2$—A and —CF$_2$—B are equal to or different from each other. The end groups and the respective molar percentages with respect to the total of the end groups are the following: —CF$_3$ 18.86%; —CF$_2$Cl 28.35%; —CF$_2$COF 52.78%. The number average molecular weight is 35,820; m=170.1, m1=32.9, n=164.9, n1=10.5, from which it results a m/n ratio=1.03.

Example 11 (Comparative)

The Example 10 was repeated but by using CFC-12 as solvent. The obtained peroxidic perfluoropolyether results to have a peroxidic content (PO), determined by iodometric analysis, of 1.48 g of active oxygen/100 g of polymer. The $^{19}$F-NMR analysis confirms the following structure:

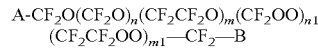

wherein the end groups —CF$_2$—A and —CF$_2$—B are equal to or different from each other. The end groups and the respective molar percentages with respect to the total of the end groups are the following: —CF$_3$ 14.7%; —CF$_2$Cl 49.3%; —CF$_2$COF 36.0%. The number average molecular weight is 35,000; m=175.8, m1=24.9, n=164.9, n1=5.3, from which it results a m/n ratio=1.1.

By comparing the data of the Example 10 with the data of the Example 11 (comparative), it results that the products obtained by using the HFC 125/227ea mixture of the present invention are substantially equal to those obtained by using CFC-12 since they substantially show the same number average molecular weight (MW), the same PO and the same m/n ratio between the ether structures (CF$_2$CF$_2$O), (CF$_2$O).

Example 12 (Comparative)

By operating under the same conditions of the Example 10 but by using only HFC-227ea instead of the HFC-125/227ea mixture of the invention, a peroxidic perfluoropolyether is obtained, having a peroxidic content (PO), determined by iodometric analysis, of 1.38.

The $^{19}$F-NMR analysis confirms the following formula:

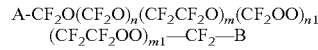

wherein the end groups —CF$_2$—A and —CF$_2$—B are equal to or different from each other. The end groups and the respective molar percentages with respect to the total of the end groups are the following: —CF$_3$ 28.64%; —CF$_2$Cl 24.16%; —CF$_2$COF 47.2%. The number average molecular weight is 37,200; m=161.9, m1=23.55, n=222.4, n1=7.5 and m/n=0.73.

By comparing the data of the Example 10 with those of the Example 12 (comparative), it results that the products obtained by using HFC-227ea instead of the HFC-125/227ea mixture, even showing a suitable molecular weight and a suitable PO to obtain the commercial product derivatives Fomblin® Z of Table 1, have however a m/n ratio out of the range suitable to prepare the commercial product derivatives Fomblin® Z of Table 1.

Example 13 (Comparative)

The Example 10 was repeated but by using HFC-125 instead of the HFC-125/227ea mixture.

After about 4 hours the test was interrupted since the separation of the peroxidic perfluoropolyether from the reaction solvent took place.

The reaction environment being unhomogeneous (biphasic), an uncontrolled growth of the PO and of the molecular weight was obtained: the peroxidic content, determined by iodometric analysis, is 4.81 g of active oxygen/100 g of polymer.

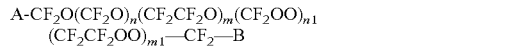

Even changing the operating conditions, in particular the chain transfer agent flow-rate, it was not possible to obtain a peroxidic perfluoropolyether soluble in the reaction solvent having a molecular weight between 35,000 and 45,000.

Example 14

Preparation of a Peroxidic Perfluoropolyether (PFPE) with PO=1.49% by using a HFC-227ea/FC-218 Mixture The Example 1 was repeated but by using a HFC-227ea/FC-218 mixture in a 53/47 w/w ratio corresponding to a ratio by volume of 50/50, reducing the flow-rates of TFE to 0.66 kg/h, 0.26 Nl/h of CTFE and 250 Nl/h of $O_2$.

A peroxidic raw product is obtained having a PO equal to 1.49 of formula:

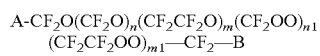
A-$CF_2O(CF_2O)_n(CF_2CF_2O)_m(CF_2OO)_{n1}$
$(CF_2CF_2OO)_{m1}$—$CF_2$—B wherein the end groups —$CF_2$—A and —$CF_2$—B are equal to or different from each other. The end groups and the respective molar percentages with respect to the total of the end groups are the following: —$CF_3$ 29.0%; —$CF_2Cl$ 37.1%; —$CF_2COF$ 33.9%. The number average molecular weight is 37,000; m=178.96, m1=32.06, n=170.29, n1=9.39, from which it results a m/n ratio=1.05.

Example 15

Obtainment of the Commercial Products Fomblin® Z-DOL from a Peroxidic Perfluoropolyether (PFPE) (I)

The peroxidic perfluoropolyether obtained in the Example 10 was reduced by reduction with $SO_2$, ethanol in the presence of catalytic amounts of iodine.

50 ml of water, 150 ml of ethanol, 300 ml of CFC 113, and 0.5 g of iodine are introduced in a 1 liter glass flask.

The solution is subjected to mechanical stirring and heated to 40° C., by feeding 160 g of peroxidic perfluoropolyether in two hours through a dropping funnel and 2-3 Nl/h of $SO_2$ through a bubbling inlet dipped in the fluid for the whole duration of the reaction. After 5 hours the mixture is discharged, by separating the underlying organic phase from the aqueous phase. The organic phase is then washed with water and, after removal of the CFC 113 by distillation, 112 g of product of formula:

T-$CF_2O(CF_2CF_2O)_r(CF_2O)_qCF_2$-T'   (II)

are obtained, wherein r=8.2, q=8.4, such that the r/q ratio results 0.98; the number average molecular weight is 1,500; the chain end groups —$CF_2$T, —$CF_2$T' are equal to or different from each other. The end groups and the respective molar percentages with respect to the total of the end groups are the following: —$CF_3$ 0.8%; —$CF_2Cl$ 1.2%; —$CF_2COOR$ (wherein R=$CH_2CH_3$) 98%, from which a functionality degree F. is deduced, defined as F=2×(functional end groups/total end groups), equal to 1.96.

The r/q ratio between the ether units ($CF_2CF_2O$), ($CF_2O$) substantially results equal to the m/n ratio between the same ether units of the precursor prepared in the Example 10.

The product of formula (II) is then subjected to reduction by $NaBH_4$ reaction according to the following procedure.

50 g of product are gradually added to a solution containing 3.5 g of $NaBH_4$ dissolved in 100 ml of anhydrous ethanol maintaining the temperature at 20° C., under stirring. When the reaction is over, an aqueous HCl solution at 5% is added until obtaining an acid pH lower than 1. The lower organic phase is separated from the upper phase and said organic phase is then subjected to distillation to give the fractions Fomblin® Z-DOL, having number average molecular weights 2,000, 2,500 and 4,000, reported in Table 1.

Example 16 (Comparative)

The Example 14 was repeated but by using only FC 218 instead of the HFC-227ea/FC-218 mixture.

A peroxidic raw product is obtained having a PO equal to 1.61 of formula:

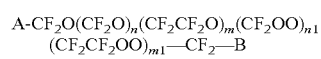
A-$CF_2O(CF_2O)_n(CF_2CF_2O)_m(CF_2OO)_{n1}$
$(CF_2CF_2OO)_{m1}$—$CF_2$—B wherein the end groups —$CF_2$—A and —$CF_2$—B are equal to or different from each other. The end groups and the respective molar percentages with respect to the total of the end groups are the following: —$CF_3$ 19.8%; —$CF_2Cl$ 49.2%; —$CF_2COF$ 31.0%. The number average molecular weight is 38,100; m=223.6, m1=24.9, n=132.1, n1=4.3, from which it results a m/n ratio=1.69.

By comparing the data of the Example 14 with those of the Example 16 (comparative), it results that the peroxidic PFPEs obtained by using FC-218 instead of the invention HFC-227ea/FC-218 mixture, even having a suitable PO and number average molecular weight, show a m/n ratio out of the range required to prepare the commercial product derivatives Fomblin® Z of Table 1. Said peroxidic PFPE is not even suitable to prepare the commercial compounds Fluorolink® and H-Galden®.

TABLE 1

Properties of the Fomblin ® Z derivatives of formula Y$CF_2O(CF_2CF_2O)_r(CF_2O)_q CF_2$Y

| | Fomblin ® Z derivative | | | | | | |
|---|---|---|---|---|---|---|---|
| | Y = $CH_2OH$ | Y = $CH_2(OCH_2CH_2)_l$—OH<br>l = 1.5 | | Y = $CH_2OCH_2CH(OH)CH_2$—OH | | Y = Aromatic | |
| | | | Commercial name | | | | |
| | Z DOL<br>2000 | Z DOL<br>2500 | Z DOL<br>4000 | Z DOL TX | Z TETRAOL | AM 2001 | AM 3001 |
| Colour | colourless | colourless | colourless | colourless | colourless | colourless | colourless |
| Molecular weight | 2,000 | 2,500 | 4,000 | 2,100 | 2,000 | 2,400 | 3,200 |
| r/q (NMR) | 1 | 1 | 1 | 1 | 1 | 1 | 1 |

TABLE 1-continued

Properties of the Fomblin ® Z derivatives of formula YCF$_2$O(CF$_2$CF$_2$O)$_x$(CF$_2$O)$_q$CF$_2$Y

|  | Fomblin ® Z derivative | | | | | | |
|---|---|---|---|---|---|---|---|
|  | Y = CH$_2$OH | | | Y = CH$_2$(OCH$_2$CH$_2$)$_r$—OH I = 1.5 | Y = CH$_2$OCH$_2$CH(OH)CH$_2$—OH | Y = Aromatic | |
|  | | | | Commercial name | | | |
|  | Z DOL 2000 | Z DOL 2500 | Z DOL 4000 | Z DOL TX | Z TETRAOL | AM 2001 | AM 3001 |
| Functionality | 1.94 | 1.96 | 1.90 | 1.94 | (1.95) | 1.94 | 1.94 |
| Viscosity a 20° C. (cSt) | 85 | 76 | 100 | 145 | 2,000 | 75 | 90 |
| Density @ 20° C. (g/ml) | 1.81 | 1.80 | 1.82 | 1.73 | 1.75 | 1.72 | 1.75 |
| Surface tension @ 20° C. (dyne/cm) | 24 | 22 | 22 | 23 | — | 25 | 25 |
| Refractive index | 1.300 | 1.297 | 1.296 | 1.316 | — | — | — |
| Vapour pressure | | | | | | | |
| at 20° (mm Hg) | 2 × 10$^{-5}$ | 1 × 10$^{-7}$ | 1 × 10$^{-8}$ | 2 × 10$^{-5}$ | 5 × 10$^{-7}$ | 1 × 10$^{-7}$ | 1 × 10$^{-8}$ |
| at 100° C. (mm Hg) | 2 × 10$^{-3}$ | 1 × 10$^{-4}$ | 1 × 10$^{-4}$ | 2 × 10$^{-3}$ | 2 × 10$^{-4}$ | 2 × 10$^{-5}$ | 1 × 10$^{-4}$ |
| Polydispersity (Mw/Mn) | 1.5 | 1.05 | 1.15 | — | — | — | — |

TABLE 2

Typical properties of Fluorolink ® for surface treatment

|  | Functional group | | | |
|---|---|---|---|---|
|  | Carboxylic acid | Alkyl amide | Silane | Phosphate |
|  | Commercial name | | | |
|  | Fluorolink C | Fluorolink A10 | Fluorolink S10 | Fluorolink F10 |
| Colour | Pale yellow | Pale yellow | Pale yellow | Pale brown |
| Molecular weight | 2,000 | 1,850-2,050 | 1,750-1,950 | 2,400-3,100 |
| r/q (NMR)[b] | ≈2.5 | ≈2.5 | ≈2.5 | ≈2.5 |
| Aspect | Liquid | Wax | Liquid | viscous liquid |
| Viscosity (cSt) | 60 | — | 173 | 18,000 |
| Density (g cm$^{-3}$) | 1.82 | 1.4 | 1.51 | 1.73 |
| Refractive index at 20° C. | — | — | 1.349 | — |
| Melting point (° C.) | — | 53 | — | — |

[b] m/n = (CF$_2$CF$_2$O)/(CF$_2$O) ratio of the perfluoropolyether chain of the commercial product

TABLE 3

Typical properties of H-Galden ®: HCF$_2$O(CF$_2$CF$_2$O)$_x$(CF$_2$O)$_q$CF$_2$H.

| Commercial degrees | ZT 85 | ZT 130 | ZT 180 |
|---|---|---|---|
| Boiling point (° C.) | 85 | 130 | 178 |
| Molecular weight | 353 | 497 | 648 |
| r/q (NMR) | 2.5 | 2.5 | 2.5 |
| Pour point (° C.) | -123 | -114 | -110 |
| Surface tension @ 25° C. (dyne/cm) | 13.7 | 14.6 | 14.6 |
| Viscosity @ 25° C. (cSt) | 0.59 | 0.89 | 1.50 |
| Density @ 25° C. (g cm$^{-3}$) | 1.60 | 1.65 | 1.69 |
| Vapour pressure @ 25° C. (torr) | 62.4 | 7.92 | 1.80 |
| Specific heat @ 25° C. (cal/g ° C.) | 0.32 | 0.29 | 0.26 |
| Thermal conductivity @ 25° C. (W/m K) | 0.102 | 0.092 | 0.088 |
| Dielectric constant @ 25° C. | 4.4 | 3.6 | 3.3 |

The invention claimed is:

1. A process for preparing peroxidic perfluoropolyethers having a peroxidic content (PO) higher than 1.2 of formula:

A-CF$_2$O(CF$_2$CF$_2$O)$_m$(CF$_2$O)$_n$—(CF$_2$CF$_2$OO)$_{ml}$(CF$_2$OO)$_{nl}$CF$_2$—B     (I)

wherein
A, B, equal to or different from each other are Cl—, F—, ClCF$_2$—, —COF, —OCOF, —CF$_3$,
m, ml, n, nl are integers such that the (m+ml)/–(n+nl) ratio is between 0.9 and 5 when (n+nl) is different from 0 and the m/n ratio is between 0.8 and 3, when n is different from 0,
the number average molecular weight is in the range 35,000-45,000,
wherein:
when m/n is between 0.8 and 1.2 (n being different from 0), the PO is between 1.2 and 1.8;
when m/n is between 1.7 and 3.0 (n being different from 0), the PO is between 2.5 and 3.5;
by tetrafluoroethylene (TFE) photooxidation in the presence of UV light, at a temperature from –80° C. to 40° C., in the presence of a mixture of solvents formed of HFC-227 (heptafluoropropane) and a solvent selected from HFC-125 (pentafluoroethane) and FC-218 (perfluoropropane), in a volumetric ratio (HFC 125 or FC 218)/HFC 227 between 90/10 and 10/90, in the presence of a chain transfer agent.

2. A process according to claim 1, wherein the TFE concentration is between 0.03 and 0.2 moles/liter of reaction mixture.

3. A process according to claim 1, wherein the oxygen is in molar excess with respect to the TFE and the partial oxygen pressure is generally between 0.1 and 2 atm.

4. A process according to claim 1, wherein the volumetric ratio HFC 125/227 is between 90/10 and 40/60; or wherein the volumetric ratio FC 218/HFC 227 is between 70/30 and 30/70.

5. A process according to claim 1, wherein the chain transfer agent is selected from fluorine, diluted with an inert gas, or chlorotrifluoroethylene.

6. A process according to claim 1 to prepare peroxidic perfluoropolyethers (I) having a PO between 1.2 and 1.8, a number average molecular weight in the range 35,000-45,000 and a m/n ratio between 0.8 and 1.2, wherein:
- the temperature is between $-70°$ C. and $-55°$ C.;
- the feeding TFE flow-rate per volume unit is between 30 and 50 kg/(h·m$^3$);
- the feeding O$_2$ flow-rate is such that the molar ratio O$_2$/TFE is between 1.1 and 3;
- the volumetric ratio HFC 125/227 is between 85/15 and 70/30, or the volumetric ratio FC-218/HFC-227 is between 70/30 and 30/70;

in the presence of a chain transfer agent selected from fluorine diluted with an inert gas or chlorotrifluoroethylene, in an amount such that the molar ratio chain transfer agent/tetrafluoroethylene is between $1·10^{-2}$ and $1·10^{-3}$ and, in the fluorine case, it is diluted with the inert gas in volume ratios from 1/50 to 1/1,000.

7. A process according to claim 1 to prepare peroxidic perfluoropolyethers (I) having a PO between 2.5 and 3.5, a number average molecular weight in the range 35,000-45,000 and a m/n ratio between 1.7 and 3.0, wherein:
- the temperature is between $-70°$ C. and $-55°$ C.;
- the feeding TFE flow-rate per volume unit is between 50 and 100 kg/(h·m$^3$);
- the feeding O$_2$ flow-rate is such that the molar ratio O$_2$/TFE is between 1.1 and 3;
- the volumetric ratio HFC 125/227 is between 85/15 and 70/30, or the volumetric ratio FC-218/HFC 227 is between 70/30 and 30/70;

in the presence of a chain transfer agent selected from fluorine, diluted with an inert gas, or chlorotrifluoroethylene, in an amount such that the molar ratio chain transfer agent/tetrafluoroethylene is between $1·10^{-2}$ and $1·10^{-3}$ and, in the fluorine case, it is diluted with the inert gas in volume ratios from 1/50 to 1/1,000.

8. A process according to claim 1, wherein the mixture of solvents is HFC-227/HFC-125.

9. A process according to claim 1, wherein the process occurs at a temperature of $-70°$ C. to $-55°$ C.

10. A process according to claim 1, wherein the volumetric ratio (HFC 125 or FC 218)/HFC 227 is between 85/15 and 30/70.

11. A process according to claim 1, wherein the TFE concentration is between 0.05 and 0.15 moles/liter.

12. A process according to claim 1, wherein the oxygen is in molar excess with respect to the TFE and the partial oxygen pressure is between 0.2 and 1 atm.

13. A process according to claim 1, wherein the volumetric ratio HFC 125/227 is between 85/15 and 70/30.

* * * * *